United States Patent [19]

Ishii et al.

[11] Patent Number: 5,051,848
[45] Date of Patent: Sep. 24, 1991

[54] METHOD AND APPARATUS FOR REPRODUCING MAGNETIC TAPE USING ROTARY DRUM HEADS

[75] Inventors: Toshiji Ishii; Kengo Sudoh, both of Higashihiroshima, Japan

[73] Assignee: Sharp Kabushiki Kaisha, Osaka, Japan

[21] Appl. No.: 350,841

[22] Filed: May 9, 1989

[30] Foreign Application Priority Data

May 9, 1988 [JP] Japan .................. 63-113288

[51] Int. Cl.$^5$ .................. G11B 15/14; G11B 5/09
[52] U.S. Cl. .................. 360/64; 360/32
[58] Field of Search .................. 360/64, 32

[56] References Cited

U.S. PATENT DOCUMENTS 4,688,115 8/1987 Takahashi et al. .................. 360/64
4,819,099 4/1989 Saito .................. 360/64

FOREIGN PATENT DOCUMENTS

A80297 6/1983 European Pat. Off. .
A180432 5/1986 European Pat. Off. .
A8200558 2/1982 PCT Int'l Appl. .
A2086691 5/1982 United Kingdom .

Primary Examiner—Aristotelis M. Psitos
Assistant Examiner—Varsha V. Sheladia

[57] ABSTRACT

Two magnetic heads having different azimuth angles are mounted on a cylindrical rotary drum. The data is recorded on the magnetic tape by means of the magnetic heads mounted on the rotary drum. When recording, a frame is composed of one track formed by one magnetic head, and another track formed by the other magnetic head. The data is recorded in the unit of one frame. When reproducing, one track is read by one magnetic head, and the other track is read by the other magnetic head. Plural sets of data to compose one frame are stored in the memory, when reproducing in the normal direction, as the addresses are specified for each set of data. The data stored in the memory is read out from the memory as the addresses are specified so as to be output in a predetermined sequence. When reproducing in the reverse direction, the data stored in the memory is read out of the memory as the addresses are specified so as to be output in the reverse sequence of the output sequence of the data of reproduction in the normal direction.

7 Claims, 8 Drawing Sheets

METHOD AND APPARATUS FOR REPRODUCING MAGNETIC TAPE USING ROTARY DRUM HEADS

BACKGROUND OF THE INVENTION

1. Field of the Invention

The present invention relates to a method and apparatus for reproducing a magnetic tape using rotary drum heads preferably applied in, for example, a digital audio tape recorder of rotary head type (R-DAT).

2. Description of the Prior Art

Figure 1:
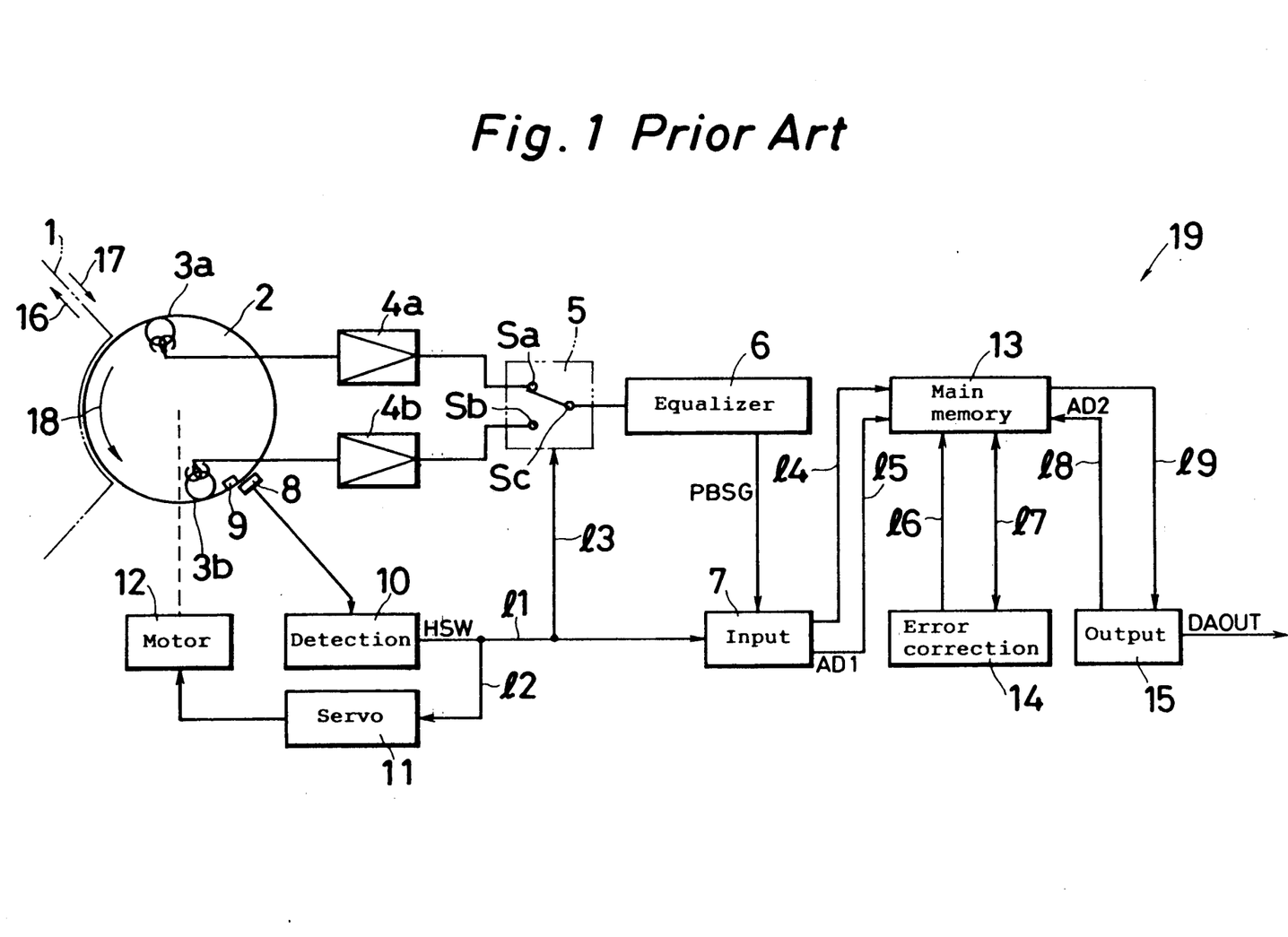
FIG. 1 is a block diagram showing a composition of a magnetic tape player 19 in a prior art.

FIG. 1 shows a magnetic tape player 19 in a digital audio tape recorder of rotary head type of a typical prior art device. The magnetic tape player 19 is composed of a rotary drum 2 mounting magnetic heads 3a, 3b having two different azimuth angles, a detecting circuit 10 for sending out a track identification signal HSW in synchronism with the rotation of the rotary drum 2, an equalizer circuit 6, an input circuit 7, a main memory 13, and an output circuit 15. The magnetic heads 3a, 3b mounted along the axis of the diameter, on the side wall of the cylindrical rotary drum 2, scan a magnetic tape 1 obliquely, and read out the information written on the magnetic tape 1. The track identification signal HSW output from the detecting circuit 10 described below, is sent to a servo circuit 11 by way of a line 12. This servo circuit 11 controls the rotation of the motor 12 on the basis of the track identification signal HSW. Consequently, the rotary drum 12 is rotated in the direction indicated by arrow 18.

A detecting element 8, such as a Hall element detects the passing of a magnet 9 built within the rotary drum 2, and sends out a signal, synchronized with the rotation of the rotary drum 2, to the detecting circuit 10. From the detecting circuit 10, for example, a track identification signal HSW is output. This becomes a high level during the period of contact of the magnetic head 3a with the magnetic tape 1, and a low level during the period of contact of the magnetic head 3b with the magnetic tape 1.

The signals from the magnetic heads 3a, 3b are amplified by amplifiers 4a, 4b respectively, and are sent out into terminals Sa, Sb of a changeover switch 5. The changeover switch 5 selectively causes either one of the terminals Sa, Sb to conduct to terminal Sc on the basis of the track identification signal HSW given to the lines 11, 13 from the detecting circuit 10. The terminal Sc is connected to the equalizer circuit 6.

In the equalizer circuit 6, the frequency characteristic of the reproduced signal is adjusted, and the output from the equalizer circuit 6 is given to the input circuit 7.

The input circuit 7 stores the data signal from the equalizer circuit 6 into the main memory 13 through line 14. At this time, in the input circuit 7, an address signal AD1 is supplied to the main memory 13 through line 15 so as to specify the address for storing the data signal. With respect to the data stored in the main memory 13, an error correction circuit 14 specifies an address through line 16. The data of the specified address is read out into the error correction circuit 14 by way of line 17, and a specified error correction process is carried out. The corrected data is sent out from the error correction circuit 14 to the main memory 13 by way of line 17. The corrected data is written into the address specified through line 16. In this way, the data having an error is rewritten into corrected data.

Afterwards, the data of the address specified by an address signal AD2, supplied from the output circuit 15 through line 18, is read out into the output circuit 15 through line 19, sequentially, from the main memory 13. The data being read out is output from the output circuit 15 sequentially as data signal DAOUT.

Figure 2:
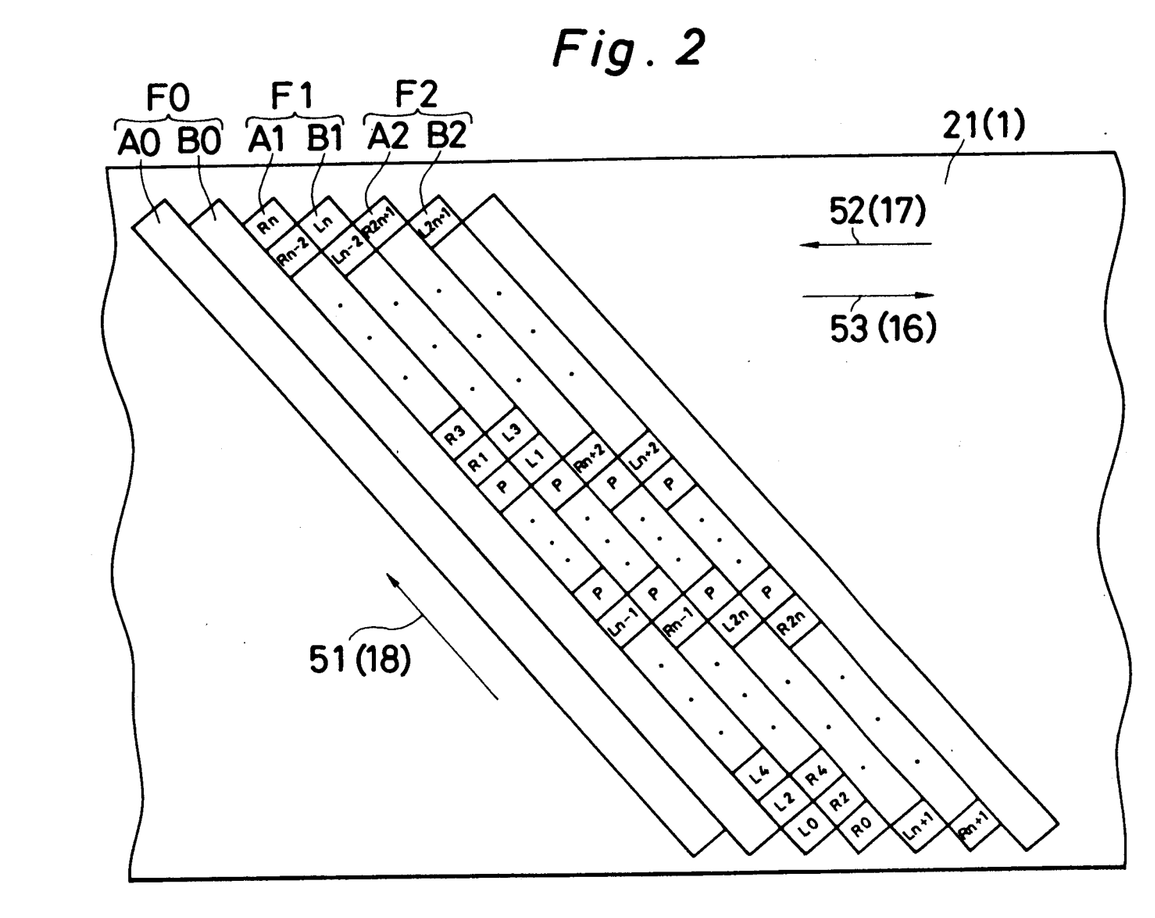
FIG. 2 is a diagram showing a track pattern on a magnetic tape 21 according to the prior art and the invention.

On the magnetic tape 1, as shown in FIG. 2, tracks Ai (i=0, 1, 2, ...) by the magnetic head 3a, and tracks Bi by the magnetic head 3b, are alternately formed.

The R-DAT, when converting an audio signal into a digital signal to record in the magnetic tape 1, changes the sequence of the sampled digital signals, and records on the magnetic tape 1. Such recording a method is called interleaving.

When recording onto the magnetic tape 1, the magnetic tape 1 runs in the direction indicated by arrow 17. When the data L0, L1, L2, ..., and data R0, R1, R2, ... at the time of sampling left audio signal and right audio signal are fed in this sequence, such data are recorded on the magnetic tape 1 in the changed sequence as shown in FIG. 2. In the middle of the magnetic tape 1, a parity check code P, which is an error correction code, is recorded together.

Figure 3:
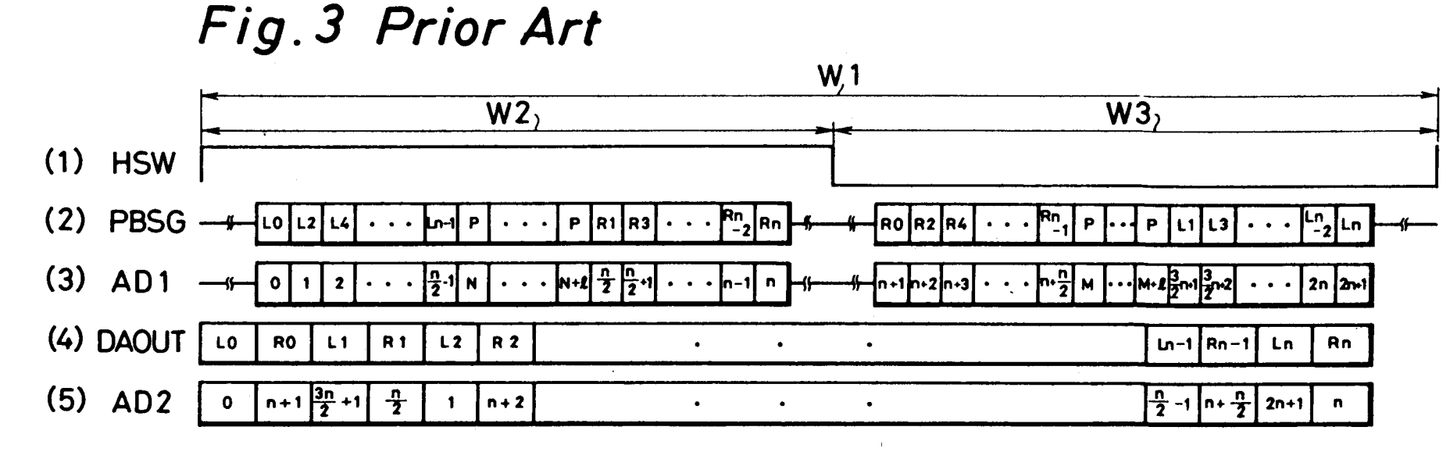
FIG. 3 is a timing chart for explaining the operation of reproduction in the normal direction of the magnetic tape player 19.

For example, when the magnetic head 3a reads out the data from track A1, as shown in FIG. 3(1), the magnetic head 3a reads out the data sequentially, in the running direction of the head during the high level period W2 of the track identification signal HSW. When the magnetic head 3a finishes reading out the data in the track A1, the magnetic head 3b reads out the data written in the track B1 in the next period W3. In this way, the data for the portion of one frame is read out in period W1.

The signal PBSG, which is read out by the magnetic heads 3a, 3b and output from the equalizer circuit 6, is shown in FIG. 3(2). The signal PBSG, from the equalizer circuit 6, is supplied and stored in the main memory 13 together with the address signal AD1 shown in FIG. 3(3) in the input circuit 7.

Concerning the parity check code P mentioned above, at this time, the data are stored in addresses N to N+1, M to M+1, different from the addresses in which data Li, Ri are stored.

The data corrected by the error correction circuit 14 is read out by the output circuit 15. The address signal AD2 output from the output circuit 15 is shown in FIG. 3(5). The data, changed in the sequence by the interleaving as mentioned above, is put back in its initial sequence when the address of the main memory 13 is specified by the address data AD2. In this way, the data signal DAOUT is output in the correct sequence from the output circuit 15 as shown in FIG. 3(4).

Figure 4:
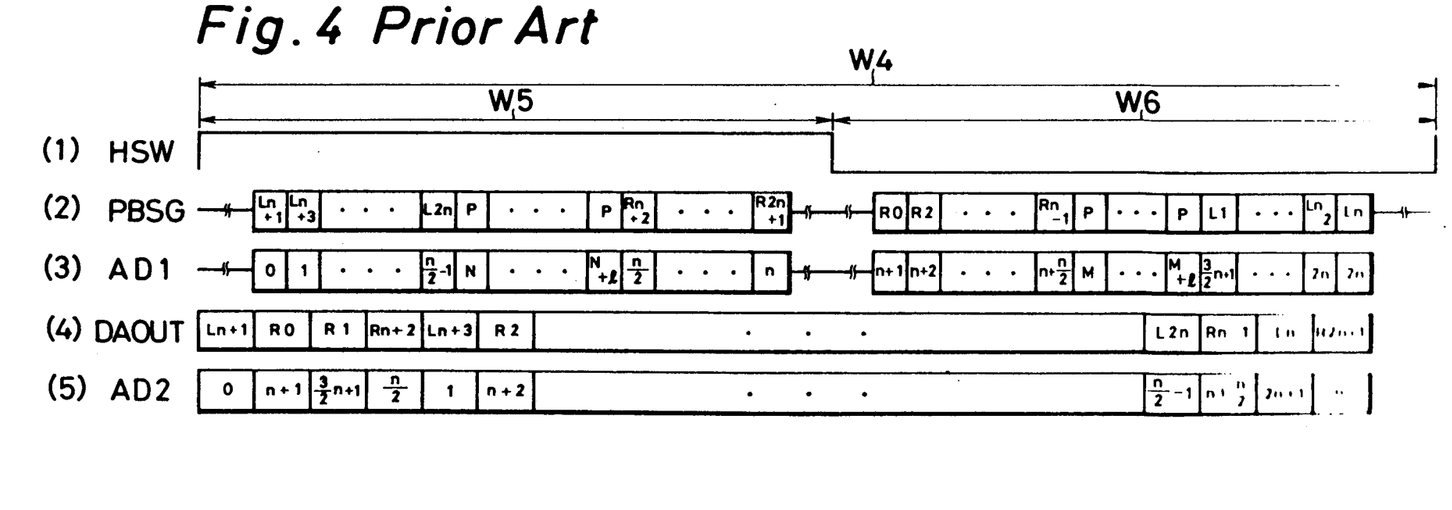
FIG. 4 is a timing chart for explaining the operation in reproduction in the reverse direction of the magnetic tape player 19.

In the magnetic tape player 19, the operation of reproducing the magnetic tape 1, while running in the direction as indicated by arrow 16, or so-called reproduction in reverse the direction is explained below. In such a reproduction in the reverse direction, in the period W5 when the track identification signal HSW is at the high level as shown in FIG. 4, the magnetic head 3a reads out the information, for example, from the track A2. Subsequently, in the period W6 when the track identification signal HSW is at the low level, the magnetic head 3b reads out the data in the track B1. In this way, in the period W4, the data for the portion of two tracks is read out. However, it is misunderstood as to form one frame by track A2 and track B1, which are different frame constituent elements. The track identification signal HSW is shown in FIG. 4(1), and the data signal PBSG is given in FIG. 4(2).

The data stored in the specified address in the main memory 13 by the address AD1 shown in FIG. 4(3) is sequentially read out by the address signal AD2 through line 18 from the output circuit 15. The address sequence specified at this time is same as that of reproduction in normal direction mentioned above. The address signal AD2 is shown in FIG. 4(5), and the data signal DAOUT output from the output circuit 15 is shown in FIG. 4(4).

In such a conventional magnetic tape player 19, only by inverting the running direction of the magnetic tape 1, the data is output in the sequence as shown in FIG. 4(2), and thus the data output sequence cannot be inverted. Therefore, in such a magnetic tape player 19, a circuit for further complicated rearrangement of the data sequence is needed, and the construction is unnecessarily complicated. Such additional circuit structure caused an increase in cost.

SUMMARY OF THE INVENTION

It is hence a primary object of the invention to solve the above problems and present a method and appartus for reproducing a magnetic tape using rotary drum heads enhanced in functions, by sending out data on the magnetic tape in the reverse sequence as the sequence of reproduction in the normal direction when reproducing in the reverse direction.

To achieve the above object, this invention presents a method for reproducing a magnetic tape using rotary drum heads characterized by:

reading a magnetic tape by using a rotary drum on which each of at least two magnetic heads, having two different azimuth angles are mounted at a spacing in the circumferential direction, forming a frame on this magnetic tape by a pair of trucks, one formed by a magnetic head with a predetermined azimuth angle, and another track formed by the other magnetic head with a different azimuth angle, reading contents from one track by the magnetic head having a predetermined azimuth angle, and reading contents from the other track by the other magnetic head having a different azimuth angle, generating a track identification signal, when reproducing in a first, normal direction, which is either one of a high level or a low level during the reproduction period of one track, and is the other one of the high level or the low level during the reproduction period of the other track, and sending out the contents read from one track and the contents ready from the other track, composing one frame, rearranged in a predetermined sequence in response to the generated track identification signal, and inverting the track identification signal, when reproducing in a second, reverse direction, selecting two tracks composing one frame in response to this inverted track identification signal, and sending out the contents read from the selected two tracks, rearranged in a sequence reverse to the sequence when reproducing in the first, normal direction.

In the magnetic tape reproducing method using rotary drum heads, the magnetic tape is read by using a rotary drum on which each of at least two magnetic heads, having two different azimuth angles, are mounted at a spacing in the circumferential direction. In this magnetic tape, a frame is composed of a pair of tracks, a track formed by a magnetic head having a specific azimuth angle, and another track formed by the other magnetic head having a different azimuth. Further, one track is ready by the magnetic head having a specific azumuth angle, and the other track is read by the magnetic head having the other azimuth angle.

According to the invention, when reproducing in the normal direction, a track identification signal is generated, which is either one of the high level or the low level during reproduction of one track, and the other one of the high level or the low level during reproduction of the other track. Further, in response to this track identification signal, the contents recorded in the two tracks forming one frame are rearranged in a predetermined sequence, and sent out.

When reproducing in the reverse direction, this track identification signal is inverted. In response to this inverted signal, the two tracks composing one frame are selected. The contents recorded in the selected two tracks are rearranged in a sequence reverse to that of the reproduction in the normal direction, and sent out.

Therefore, when reproducing in the reverse direction, since the track identification signal is inverted and the two tracks composing one frame can be correctly selected by this, it is possible to sent out the contents recorded in two tracks composing one frame. This is achieved by rearranging, in the reverse sequence of the sequence in reproduction in the normal direction, by addition of only a simple structure.

As explained herein, according to the invention, by only adding a simple circuit structure, the data recorded on the magnetic tape can be output in the sequence completely opposite to the recording sequence, when reproducing in the reverse direction. It is therefore possible to realize a magnetic tape reproducing apparatus using rotary drum heads possessing higher functions.

The invention further presents an apparatus for reproducing a magnetic tape using rotary drum heads comprising:

a rotary drum rotated in a predetermined direction, and having each of at least two magnetic heads possessing two different azimuth angles installed thereon in the peripheral direction, a magnetic tape driven in contact with the rotary drum, and means for driving the magnetic tape, to contact the rotary drum, in a first running direction and in a second running direction, opposite to the first running direction, the magnetic tape including a frame composed of a pair of tracks, including a track formed by a magnetic head having a specific azimuth angle, and another track formed by a magnetic head having a different azimuth angle. Further, one track is read by the magnetic head having a specific azimuth angle and the other track is read by the other magnetic head having a different specific azimuth angle, means for detecting a reading state for the magnetic heads and for sending out a signal to express the detected reading state, a memory for storing data read from in two tracks forming one frame, at sequential addresses of reading of the data according to the signal sent out from the means for deleting the reading state, and means for controlling outputting of the data from the addresses in the memory by specifying the addresses in the sequence corresponding to the reading of the data, so that the data may be output in a predetermined sequence when the magnetic tape is driven in the first running direction, and outputting of the data from the addresses stored in the memory, by specifying the addresses in a sequence so that the data may be output in a reverse sequence to that of the predetermined sequence, when the magnetic tape is driven in the second running direction.

The magnetic tape reproducing apparatus using rotary drum heads of the invention also comprises means for correcting errors of every frame of data that has been read.

The reading state detecting means of the magnetic tape reproducing apparatus using rotary drum heads of the invention further comprises a magnetic object of detection mounted on the rotary drum, and means for detecting the magnetic object magnetically being provided at a fixed position.

The magnetic tape reproducing apparatus using rotary drum heads of the invention possesses a changeover switch for changing over and leading out the outputs of the magnetic heads in the period of each magnetic head contacting with the magnetic tape in response to the output of the reading state detecting means so as to supply the output of the changeover switch to the memory.

BRIEF DESCRIPTION OF THE DRAWINGS

These and other objects of the invention, as well as the features and advantages thereof, will be better understood and appreciated from the following detailed description taken in conjunction with the drawings, in which.

DETAILED DESCRIPTION OF THE PREFERRED EMBODIMENTS

Referring now to the drawings, some of the preferred embodiments of the invention are described in the details below.

Figure 5:
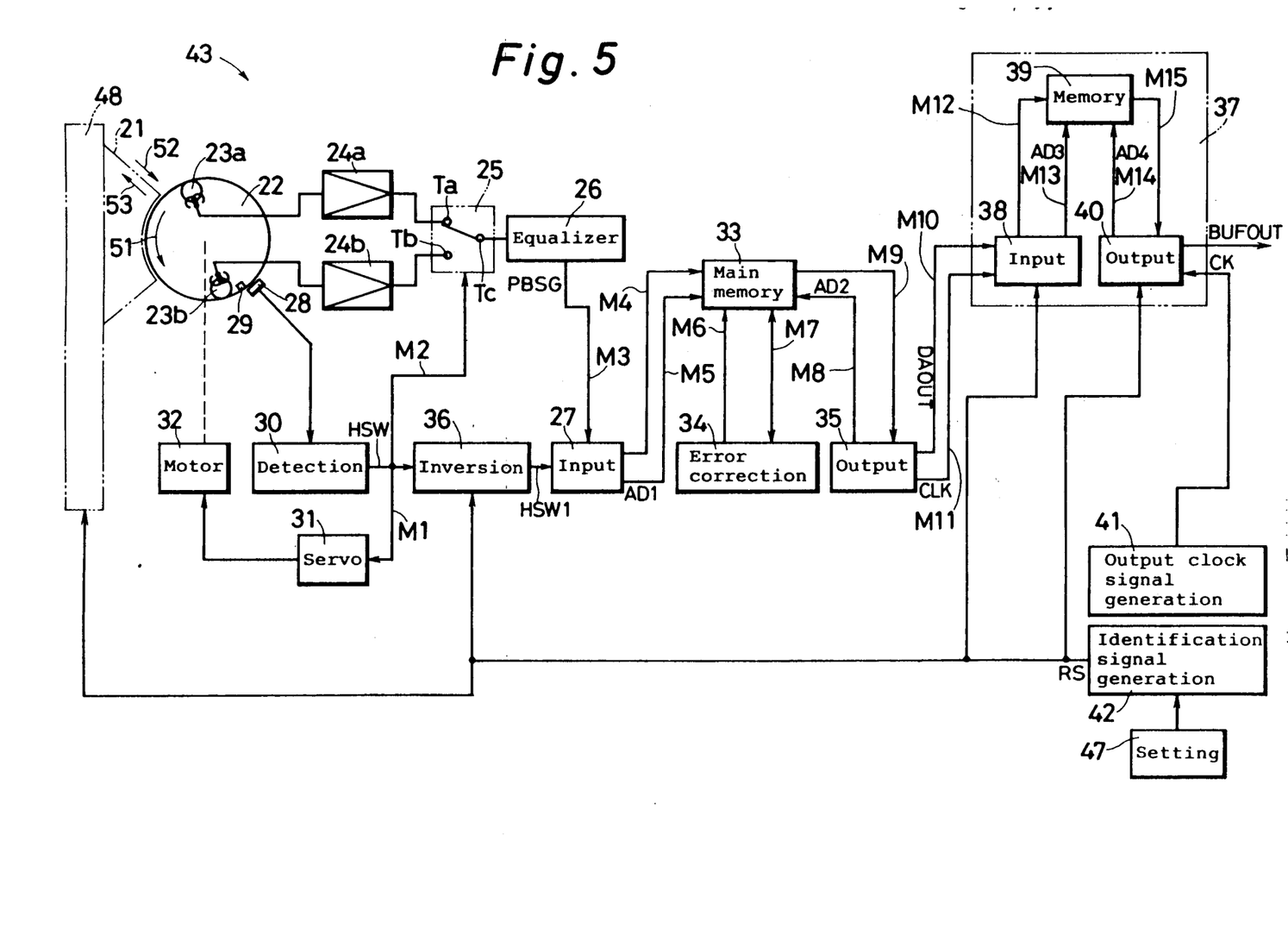
FIG. 5 is a block diagram showing a composition of a magnetic tape player 43 in one of the embodiments of the invention.

FIG. 5 is a block diagram showing the structure of a magnetic tape player 43 in an embodiment of the invention. The magnetic tape player 43 is composed of a rotary drum 22, a detecting circuit 30 for generating a track identification signal HSW which is described later, an inverting circuit 36, an input circuit 27, a main memory 33, an output circuit 35, and a buffer circuit 37.

Magnetic heads 23a, 23b are mounted on the cylindrical rotary drum 22 at positions 180 degrees opposite to each other. The magnetic heads 23a, 23b are installed at different azimuth angles in order to prevent noise due to crosstalk. For example, the magnetic head 23a is mounted on the rotary drum 22 at an azimuth angle of +20 degrees, and the magnetic head 23b, at an azimuth angle of −20 degrees.

The rotary drum 22 is rotated in the direction indicated by arrow 51, about the axial line, at a speed of, for example, 2000 rpm by means of a motor 32 mentioned later. The rotary drum 22 is also furnished with a magnet 29 for detecting the rotation of the rotary drum 22.

Near the rotary drum 22, a detecting element 28, realized by a Hall element or the like, is fixed, and the rotation of the rotary drum 22 is detected by this. The detecting circuit 30 outputs a track identification signal HSW which becomes a high level, including the reproducing action period of the magnetic head 23a on the basis of the signal from the detecting element 28. It further becomes a low level, including the reproduction period of the magnetic head 23b. This track identification signal HSW is given to the changeover switch 25, inverting circuit 36, and servo circuit 31.

The servo circuit 31 controls the rotating speed of the motor 32 on the basis of the track identification signal HSW. The motor 32 rotates the rotary drum 22 in the direction indicated by arrow 51.

FIG. 2 shows a track pattern on the magnetic tape 21. Tracks A0, A1, A2, ... are the portions recorded by the magnetic head 23a, and these tracks A0, A1, A2, ... are read by the magnetic head 23a. Tracks B0, B1, B2, ... are the portions recorded by the magnetic head 23b, and these tracks B0, B1, B2, ... are read by the magnetic head 23b. A track Ai (i=0, 1, 2, ...) and a track Bi make up one frame Fi.

In the R-DAT, the data row is rearranged when recorded on the magnetic tape 21. For example, when converting an audio signal onto a digital signal and recording into the magnetic tape 21, the left signal of the audio signal is sequentially sampled and sent out in the sequence of data L0, L1, L2, ... (collectively called data Li), while the right signal is sampled and sequentially sent out in the sequence of R0, R1, R2, ... (collectively called data Ri). In such a case, as shown in FIG. 2, the data Li, Ri are rearranged in their sequence, and are recorded on the magnetic tape 21. In the middle part of the magnetic tape 21, a parity check code P is recorded as a correction code for correcting an error. A set of data is composed of plural bits, and has a specific meaning. This rearrangement is completed within one frame Fi.

The magnetic tape 21 is run and driven by means for driving magnetic tape running 48. The signals read out by the magnetic heads 23a, 23b from the magnetic tape 21 are amplified by amplifiers 24a, 24b, and are sent out into terminals Ta, Tb of the changeover switch 25.

The changeover circuit 25 sets the terminals Ta, Tc in a conductive state when the track identification signal HSW is at high level, and sets the terminals Tb, Tc in a conductive state when the track identification signal HSW is at a low level. As a result, the reproduction signals from the magnetic heads 23a, 23b are changed over, and are sent out into the equalizer circuit 26.

At the equalizer circuit 26, adjusting the frequency characteristic of the reproduction signals, a signal PBSG is supplied to the input circuit 27 through line M3. The input circuit 27 outputs the data from the equalizer circuit 26, together with the address signal, to the main memory 33, on the basis of the signal HSW1 from the inverting circuit 36, which is described later.

When either reproduction in the normal direction or reproduction in the reverse direction is specified by means for setting 47, an identification signal generating circuit 42 outputs an identification signal RS which is at a low level when reproducing in the normal direction, and at a high level when reproducing in the reverse direction. The inverting circuit 36, on the basis of this identification signal RS, sends out the track identification signal HSW to the input circuit 27 as signal HSW1 when reproducing in the normal direction, and sends out the inverted signal of the track identification signal HSW to the input circuit 27 as signal HSW1 when reproducing in the reverse direction. Meanwhile, the magnetic tape running driving means 48 runs and drives the magnetic tape 21 in the direction of arrow 52 when reproducing in the normal direction while the identification signal RS is at a low level, and runs and drives the magnetic tape 21 in the direction, of arrow 53 when reproducing in the reverse direction while the identification signal RS is at a high level.

The input circuit 27 specifies the address on the main memory 33 by the address signal AD1 supplied through the address bus M5, and stores the data from the equalizer circuit 26 in a unit of one frame, at the specified address of the main memory 33 through the data bus M4.

The data of one frame stored in the main memory 33 is corrected, when an error is contained, by the parity check code P described below in an error correction circuit 34. The error correction circuit 34 specifies the address of the main memory 33 through address bus M6, reads out the data at the specified address through data bus M7, and corrects the error. The corrected data is written into the main memory 33 from the data bus M7, at the specified address through the address bus M6.

The data of the main memory 33, after error correction, is read out by the output circuit 35. The output circuit 35, in turn, specifies the address of the main memory 33 through the address bus M8, and reads out the data of the specified address through the data bus M9. The operation for specifying the address of the output circuit 35 is conducted as mentioned below. Consequently, the data Li, Ri changed in sequence when recording onto the magnetic tape 21, is returned to the original sequence and output.

From the output circuit 35, a clock signal CLK is sent out to the buffer circuit 37 by way of line M11. In synchronism with this clock signal CLK, the data signal DAOUT read out from the main memory 33 through the line M10 is sent out to the buffer circuit 37 together with the clock signal CLK.

The buffer circuit 37 comprises memory 39, input circuit 38, and output circuit 40. The clock signal CLK and data signal DAOUT from the output circuit 35 are supplied to the input circuit 38. The input circuit 38 outputs the data through data bus M12, and also outputs address signal AD3 through address bus M13, thereby specifying the address on the memory 39. Such operation is effected on the data of every one frame. The input signal 38 receives the identification signal RS mentioned above, and when reproducing in the reverse direction, the lower one bit is inverted in the address signal when specifying the address as mentioned below, and the data is supplied to the memory 39 through address bus M13.

The data for one frame stored in the memory 39 is read out by the output circuit 40. The output circuit 40 specifies the address by the address signal increasing sequentially from 0 by the address signal AD4 through the address bus M14 when reproducing in the normal direction as mentioned below, and reads out the data of the specified address through the data bus M15, and outputs as the data signal BUFOUT. When reproducing in the reverse direction, the address is specified by the sequentially decreasing address number. Therefore, when reproducing in the reverse direction, the data is read out in the completely reverse sequence as in reproduction in the normal direction from the memory 39. Reading of data from the memory 39 by the output circuit 40 is synchronized with the clock signal from the output clock signal generating circuit 41.

Figure 6:
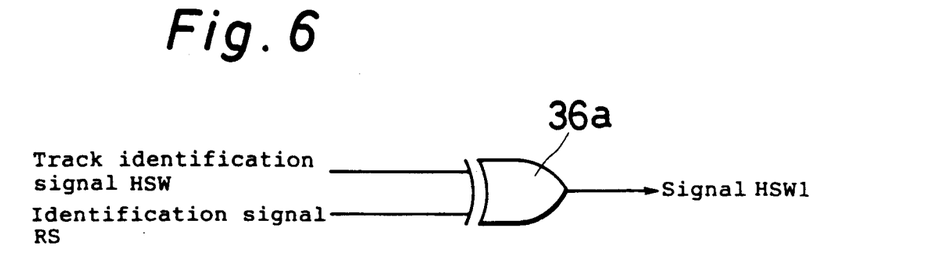
FIG. 6 is a drawing showing a structural example of an inverting circuit 36.

FIG. 6 is a diagram showing a circuit structure example of the inverting circuit 36. The inverting circuit 36 comprises, for example, an exclusive OR gate 36a. At one input unit of this exclusive OR gate 36a, the track identification signal HSW from the detecting circuit 30 is supplied. At the other input unit, the identification signal RS from the identification signal generating circuit 42 is given. The output from the exclusive OR gate 36a is given to the input circuit 27 as signal HSW1. The truth value table of such exclusive OR gate 36a is shown in Table 1.

TABLE 1

| INPUT | | OUTPUT |
| --- | --- | --- |
| HSW | RS | HSW1 |
| 0 | 0 | 0 |
| 1 | 0 | 1 |
| 0 | 1 | 1 |
| 1 | 1 | 0 |

Figure 7:
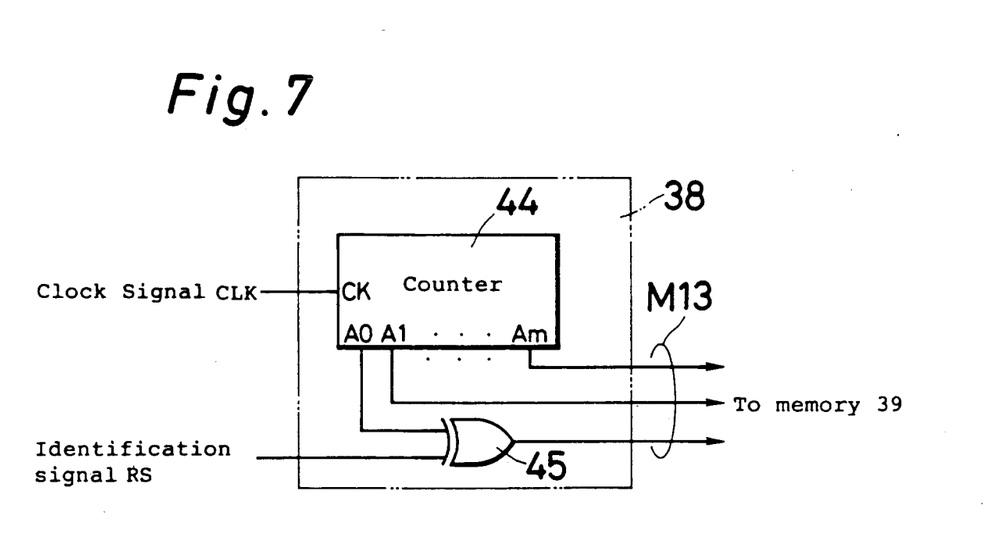
FIG. 7 is a block diagram showing a structure related to the address specification of an input circuit 18.

FIG. 7 is a diagram showing the structure relating to the address specification of the input circuit 38. The input circuit 38 comprises, for example, a counter 44 and an exclusive OR gate 45. To the counter 44, a clock signal CLK from the output circuit 35 is fed, the pulse of the clock signal CLK is latched, and the count value is increased sequentially. This count value is output from terminals A0 to Am. The terminal A0 of the lowest bit is connected to one input unit of the exclusive OR gate 45, and the other input unit of this exclusive OR gate 45 is provided with identification signal RS from the identification signal generating circuit 42. The output from the exclusive OR gate 45 and the output wires from terminals A1 to Am compose the address bus M13.

Figure 8:
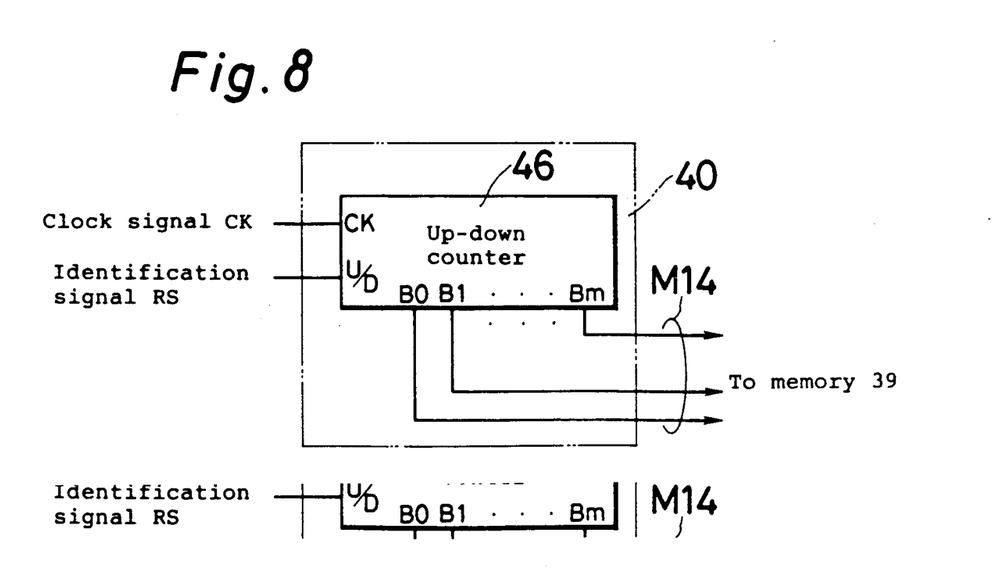
FIG. 8 is a block diagram showing a structure related to the address specification of an output circuit 40.

FIG. 8 is a diagram showing a constitution relating to address specification of output circuit 40. The output circuit 40 includes an up-down counter 46. This up-down counter 46 is provided with clock signal CK from the output clock signal generating circuit 41, and an identification signal RS from the identification signal generating circuit 42. The up-down counter 46 sequentially increases the count value by latching the pulses of clock signal CK when the identification signal RS is at a low level, and decreases the count value sequentially when the identification signal Rs is at a high level. This count value is sent out to terminals B0 to Bm. The output wires from the terminals B0 to Bm compose an address bus M14 and are connected to the memory 39.

Figure 9:
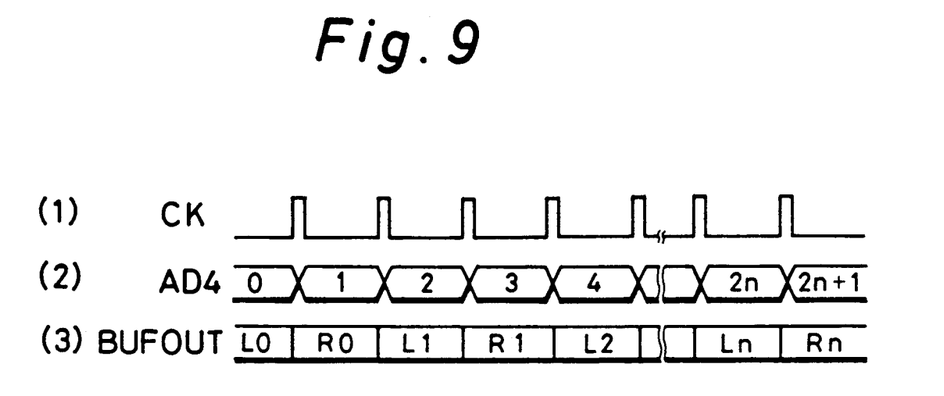
FIG. 9 is a timing chart for explaining the operation of reproduction in the normal direction of the output circuit 40.

FIG. 9 is a timing chart for explaining the operation in reproduction in the normal direction in the up-down counter 46. When data for one frame is stored in the memory 39, the up-down counter 46 outputs an address signal AD4 in synchronism with the clock signal CK from the output clock signal generating circuit 41 shown in FIG. 9 (1). The address signal AD4 is sequentially increased from 0 as shown in FIG. 9 (2). The data signal BUFOUT, output from the output circuit 40 as being read out from the memory 39 at this time, is shown in FIG. 9 (3).

Figure 10:
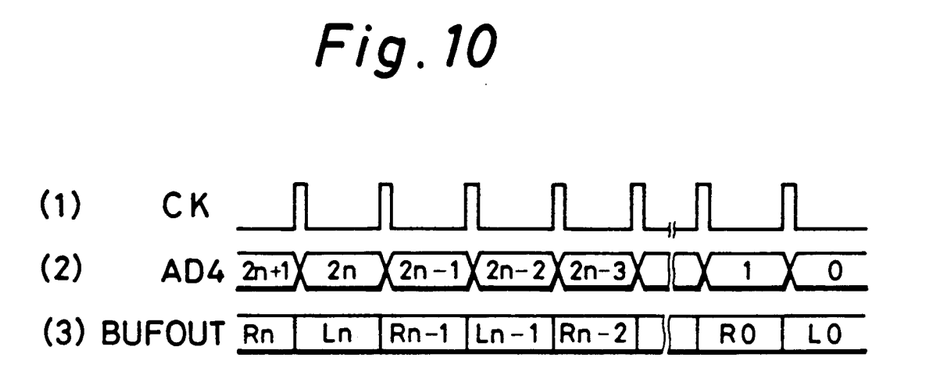
FIG. 10 is a timing chart for explaining the operation of reproduction in the reverse direction of the output circuit 40.

FIG. 10 is a timing chart for explaining the operation of reproduction in the reverse direction of the output circuit 40. When reproducing in the reverse direction, the identification signal RS is at a high level, and the up-down counter 46 functions as a down counter. In synchronism with the clock signal CK from the output clock signal generating circuit 41, a count value for sequentially decreasing from the initial value 2n+1 is output from the up-down counter 46 as address signal AD4. As a result, as shown in FIG. 10 (3), the data signal BUFOUT supplied from the output circuit 40 becomes a signal expressing a data row in a completely different sequence from the reproduction in the normal direction.

Figure 11:
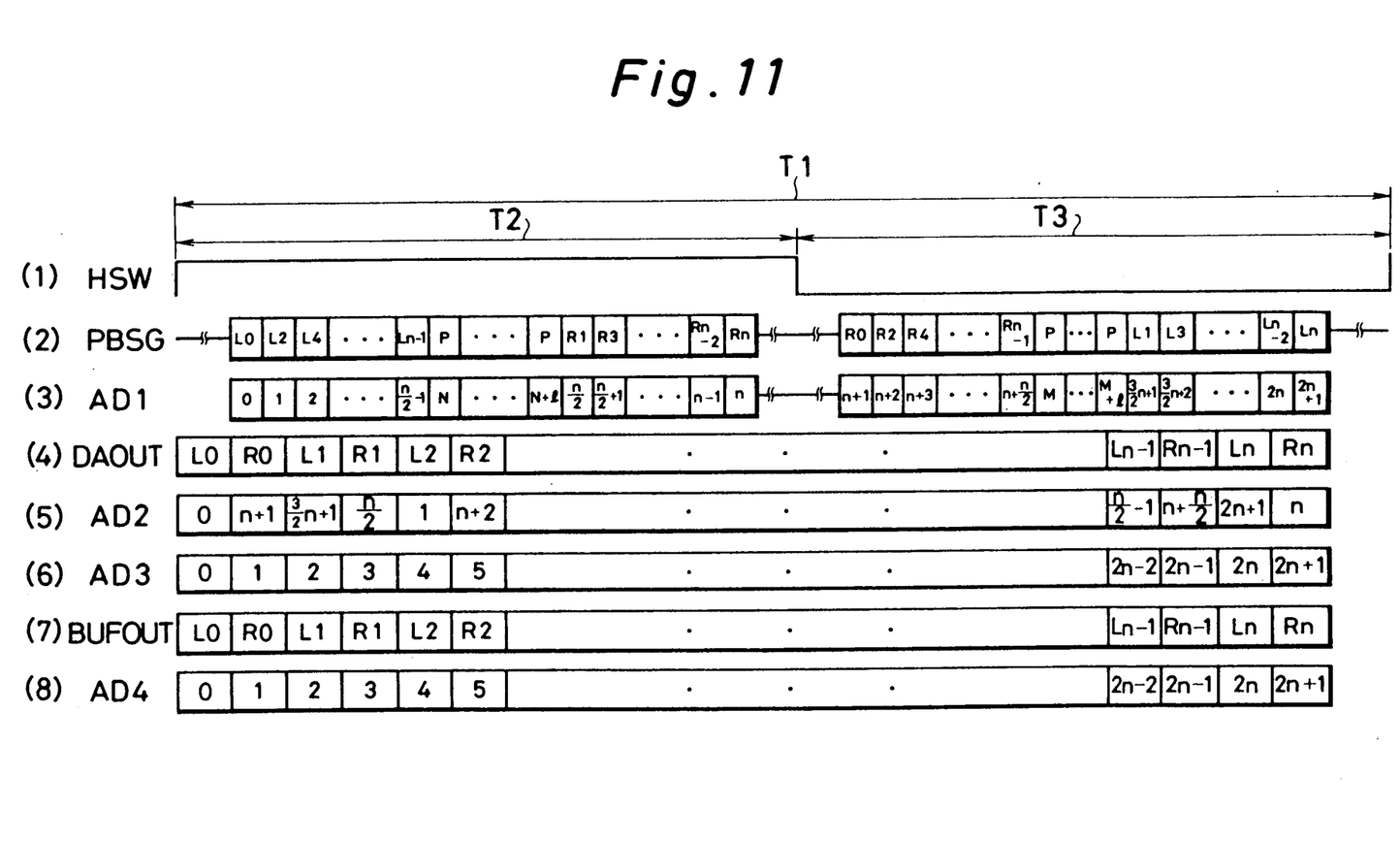
FIG. 11 is a timing chart for explaining the operation of reproduction in the normal direction of the magnetic tape player 43.

FIG. 11 is a timing chart for explaining the operation of reproduction in the normal direction of the magnetic tape player 43. The track identification signal HSW is at a high level in period T2 as shown in FIG. 11 (1), and is at a low level in period T3. Period T1 is the rotation period of the rotary drum 22. When reproducing in the normal direction, the magnetic tape 21 is scanned in the direction indicated by arrow 52. Therefore, from the equalizer circuit 26, the data signal PBSG shown in FIG. 11 (2) is output. In period T1, this data signal PBSG is composed of the data read out from the track A1 by the magnetic head 23a in period T2, and the data read out from the track B1 by the magnetic head 23b in period T3.

The input circuit 27 recognizes the data signal PBSG entered in the period when the signal HSW1 is at a high level by this signal HSW1 of the same waveform as the track identification signal HSW when reproducing in the normal direction, and in the subsequent low level period, as the signals of one frame, and outputs the address signal AD1 in synchronism with the entered data signal PBSG. The address signal AD1 is shown in FIG. 11 (3).

The output circuit 35 specifies the address of the main memory 33 in the form of address signal AD2 shown in FIG. 11 (5), and reads out the data stored at the specified address, and output as data signal DAOUT. The data signal DAOUT is as shown in FIG. 11 (4).

The input circuit 38 attaches an address to the data row supplied from the output circuit 35. The form of specifying the address at this time is as shown in FIG. 11 (6). Consequently, data Li, Ri in the data signal DAOUT are stored in the memory 39 in the same sequence as the output from the output circuit 35.

At the output circuit 40, as shown in FIG. 11 (8), the address signal AD4 increases sequentially from 0, and the address of the memory 39 is specified accordingly. In synchronism with this address signal AD4, the data at the specified address is read out from the memory 39. The data signal BUFOUT output from the output circuit 40 is shown in FIG. 11 (7). When reproducing in the normal direction, as the data signal BUFOUT, the data Li, Ri are output in the same sequence as in the data signal DAOUT.

Figure 12:
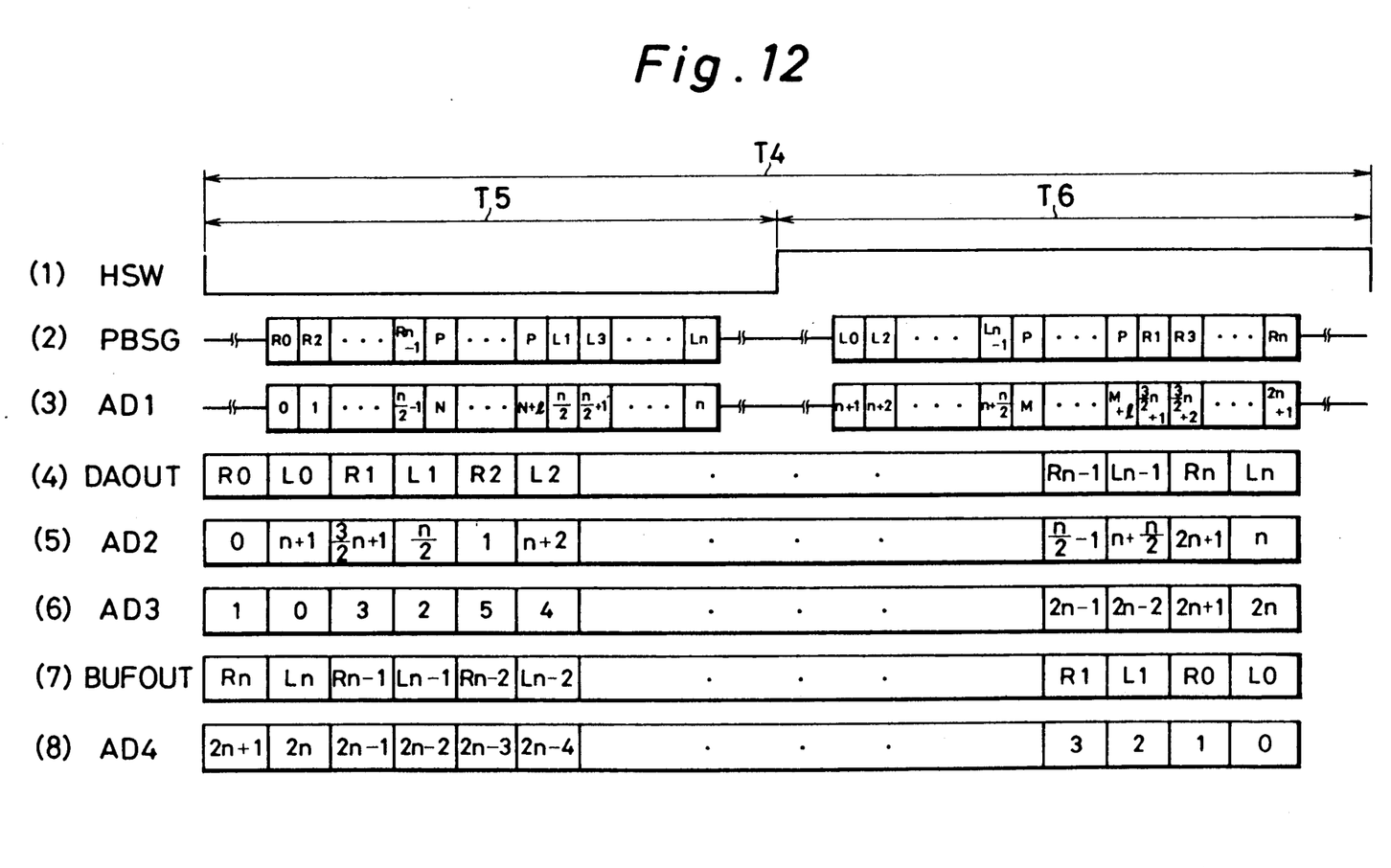
FIG. 12 is a timing chart for explaining the operation of reproduction in the reverse direction of the magnetic tape player 43.

FIG. 12 is a timing chart for explaining the operation of reproduction in the reverse direction of the magnetic tape player 43. In period T4, when data of one frame is output, the track identification signal HSW is at a low level in period T5 as shown in FIG. 12 (1), and is at a high level in period T6. When reproducing in the reverse direction, the magnetic tape 21 is run in the direction indicated by arrow 53. Therefore, from the equalizer circuit 26, the data signal PBSG shown in FIG. 12 (2) is output. Meanwhile, during reproduction in the reverse direction, since the running direction of the magnetic tape is inverted, the scanning direction of the magnetic heads 23a, 23b on the magnetic tape 21 changes. However, the rotating speed of the rotary drum 22 is sufficiently faster than the running speed of the magnetic tape, the change in the running direction is slight, and the magnetic heads 23a, 23b can read the data in tracks Ai, Bi, respectively.

In period T4, this data signal PBSG is the signal read out of the track B1 by the magnetic head 23b in period T5, and the signal read out of the track B1 by the magnetic head 23a in period T6.

In the input circuit 27, when reproducing in the reverse direction, the signal HSW1 inverted from the track identification signal HSW is given as shown in Table 1, by means of the inverting circuit 36. Accordingly, the input circuit 27 recognizes the data signal PBSG entered in the period when the signal HSW1 is at a high level and in the subsequent low level period, as signals in one frame, and outputs an address signal AD1 in synchronism with the input data signal PBSG. The address signal AD1 is shown in FIG. 12 (3).

The output circuit 35 specifies the address in the main memory 33 by the address signal AD2 supplied in the form shown in FIG. 12 (5), and reads out and outputs the data stored at the specified address. The data signal DAOUT is shown in FIG. 12 (4).

The input circuit 38 attaches an address to the data row supplied from the output circuit 35. At this time, when specifying the address, the lowest bit of the counter 44 is inverted by the exclusive OR gate 45, and the form of address specification at this time is as shown in FIG. 12 (6). As a result, in the memory 39, the data signal DAOUT is stored in the sequence of exchanging Ri and Li.

In the output circuit 40, as shown in FIG. 12 (8), the address signal AD4 sequentially decreases from 2n+1, and the address on the memory 39 is specified accordingly. In synchronism with this address signal, the data at the specified address is read out from the memory 39. The data signal BUFOUT, output from the output circuit 40 is as shown in FIG. 12 (7). Further, data Li, Ri are output in a completely different sequence from the order of reproduction in the normal direction.

Thus, in the magnetic tape player 43, when reproducing in the reverse direction, the data written in the magnetic tape 21 can be output in a completely different sequence from the reproduction in the normal direction. By adding a simple circuit structure, such a reproduction in the reverse direction can be realized.

In this embodiment, the magnetic tape player of R-DAT is explained. However, the invention may be similarly applied to any other magnetic tape reproducing apparatus using rotary drum heads for reproducing the magnetic tape in which data is recorded in two adjacent tracks as one block, such as a pulse coded modulation reproduction apparatus of a video tape, and other magnetic tape players using a rotary drum.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for reproducing a magnetic tape using rotary drum heads comprising the steps of:

forming a frame on a magnetic tape, the frame including a pair of tracks, one track being formed by a magnetic head, mounted on a rotary drum with a predetermined azimuth angle, and the other track being formed by a second magnetic head, mounted on the rotary drum at a circumferential spacing from the first magnetic head, with a different azimuth angle;

reading contents from one track by the magnetic head having a predetermined azimuth angle, and reading contents from the other track by the other magnetic head having a different azimuth angle;

generating a track identification signal, during reproduction in a first direction, which is one of a high level and a low level during reproduction of one track and is a different one of the high level and low level during reproduction of the other track;

sending out the contents read from one track and the contents read from the other track, for each frame, rearranged in a predetermined sequence, in response to the generated track identification signal; and inverting the track identification signal, during reproduction in a second direction, reverse of the first direction, selecting two tracks composing one frame in response to this inverted track identification signal, and sending out the contents read from the selected two tracks, rearranged in a sequence reverse to the sequence during reproduction in the first direction.

2. An apparatus for reproducing a magnetic tape using rotary drum heads comprising:

a rotary drum rotated in a single predetermined direction, including at least two magnetic heads, each of a different azimuth angle, mounted thereon in a peripheral direction;

a magnetic tape driven in contact with the rotary drum;

driving means for driving the magnetic tape, to contact the rotary drum, in a first running direction and in a second running direction, opposite to the first running direction, the magnetic tape including a frame, the frame further including a pair of tracks, one track being formed by a first of said at least two magnetic heads, having a predetermined azimuth angle, and the other track being formed by a second of said at least two magnetic heads, having a different azimuth angle, said first and second magnetic heads subsequently reading the one track and the other track, respectively;

means for detecting a reading state for the magnetic heads and for sending out a signal to express the detected reading state;

a memory for storing data read from two tracks forming one frame, at addresses sequentially corresponding to the reading of the data, according to the signal sent out from the means for detecting the reading state; and means for controlling outputting of the data from the addresses in the memory, by specifying the addresses in the sequence corresponding to the reading of the data, so that the data may be output in a predetermined sequence when said magnetic tape is driven in the first running direction, and outputting the data from the addresses in the memory, by specifying the addresses in a sequence so that the data may be output in a reverse sequence to that of the predetermined sequence, when said magnetic tape is driven in the second running direction.

3. The apparatus of claim 2, further comprising correcting means for correcting errors in data of every frame being read.

4. The apparatus of claim 2, wherein the means for detecting the reading state includes a magnetic detection object, mounted on the rotary drum, and means for magnetically detecting the magnetic object as being located at a fixed position.

5. The apparatus of claim 2, further comprising a changeover switch for switching between the outputs of the first and second magnetic heads while the magnetic heads are in contact with the magnetic tape, in response to the output signal of the means for detecting the reading state, and supplying an output of the changeover switch to the memory.

6. The apparatus of claim 1, wherein the magnetic tape travels at the same speed during reproduction in both the first and second directions.

7. The apparatus of claim 1, wherein the rotary drum rotates in the same direction during reproduction in both the first and second directions.

* * * * *